(12) United States Patent
Arslan et al.

(10) Patent No.: US 8,196,081 B1
(45) Date of Patent: Jun. 5, 2012

(54) INCREMENTAL PLACEMENT AND ROUTING

(75) Inventors: Hasan Arslan, Sunnyvale, CA (US); Vinay Verma, Fremont, CA (US); Sandor Kalman, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 244 days.

(21) Appl. No.: 12/751,175

(22) Filed: Mar. 31, 2010

(51) Int. Cl.
*G06F 17/50* (2006.01)
*G06F 9/455* (2006.01)

(52) U.S. Cl. ........ 716/126; 716/101; 716/103; 716/104; 716/108; 716/113; 716/116; 716/119; 716/122; 716/123; 716/131; 703/14; 703/19

(58) Field of Classification Search ............... 716/101, 716/103, 104, 108, 113, 116, 119, 122, 123, 716/126, 128, 130, 131; 703/14, 19
See application file for complete search history.

(56) References Cited

U.S. PATENT DOCUMENTS

| | | | | |
|---|---|---|---|---|
| 5,452,239 A * | 9/1995 | Dai et al. | | 703/19 |
| 5,784,289 A * | 7/1998 | Wang | | 716/122 |
| 5,867,396 A | 2/1999 | Parlour | | |
| 6,026,220 A | 2/2000 | Cleereman et al. | | |
| 6,043,692 A | 3/2000 | Linoff | | |
| 6,058,252 A * | 5/2000 | Noll et al. | | 716/113 |
| 6,134,705 A | 10/2000 | Pedersen et al. | | |
| 6,230,304 B1 * | 5/2001 | Groeneveld et al. | | 716/113 |
| 6,484,292 B1 | 11/2002 | Jain et al. | | |
| 6,490,717 B1 | 12/2002 | Pedersen et al. | | |
| 6,530,073 B2 * | 3/2003 | Morgan | | 716/102 |
| 6,668,365 B2 * | 12/2003 | Harn | | 716/123 |
| 6,871,336 B1 * | 3/2005 | Anderson | | 716/122 |
| 7,086,029 B1 * | 8/2006 | Barras et al. | | 716/103 |
| 7,086,030 B1 | 8/2006 | Stroomer et al. | | |
| 7,111,268 B1 * | 9/2006 | Anderson et al. | | 716/113 |
| 7,134,112 B1 | 11/2006 | Anderson et al. | | |
| 7,149,993 B1 | 12/2006 | Aggarwal et al. | | |
| 7,181,704 B1 * | 2/2007 | Downs et al. | | 716/103 |
| 7,191,426 B1 * | 3/2007 | Singh et al. | | 716/104 |
| 7,222,311 B2 * | 5/2007 | Kaufman et al. | | 716/113 |
| 7,225,116 B2 * | 5/2007 | Harn | | 703/14 |
| 7,415,687 B2 * | 8/2008 | Lahner et al. | | 716/122 |
| 7,424,697 B1 * | 9/2008 | Arslan et al. | | 716/116 |
| 7,428,718 B1 | 9/2008 | Singh et al. | | |
| 7,437,695 B1 * | 10/2008 | Ranjan et al. | | 716/113 |
| 7,490,312 B1 | 2/2009 | Ochotta et al. | | |
| 7,500,216 B1 * | 3/2009 | Blunno et al. | | 716/104 |
| 7,536,661 B1 | 5/2009 | Singh et al. | | |
| 7,590,951 B1 | 9/2009 | Bell, II et al. | | |

(Continued)

*Primary Examiner* — Helen Rossoshek
(74) *Attorney, Agent, or Firm* — LeRoy D. Maunu; Lois D. Cartier

(57) ABSTRACT

In one embodiment of the invention, a processor-implemented method is provided for routing of a partially routed circuit design. Modified signals of the partially routed circuit design are determined. A first set of routing constraints are applied by the processor to the unmodified signals of the circuit design. For each logic block of the circuit design, the number of the modified signals and the number of the unmodified signals connected to the logic block are determined. In response to one of the logic blocks having a ratio of the number of modified signals to the number of unmodified signals greater than a threshold ratio, the routing constraints are removed by the processor from one or more of the unmodified signals of the one of the logic blocks. The partially routed circuit design is then routed by the processor according to the remaining routing constraints, and the resulting netlist is stored.

20 Claims, 4 Drawing Sheets

U.S. PATENT DOCUMENTS

| | | | |
|---|---|---|---|
| 7,681,165 B2 * | 3/2010 | Peters et al. | 716/119 |
| 7,739,097 B2 * | 6/2010 | Sample et al. | 703/19 |
| 7,805,697 B2 * | 9/2010 | Wood | 716/113 |
| 7,996,797 B1 * | 8/2011 | Singh et al. | 716/103 |
| 8,010,923 B1 * | 8/2011 | Srinivasan et al. | 716/116 |
| 8,010,928 B1 * | 8/2011 | Birch et al. | 716/126 |
| 8,099,700 B1 * | 1/2012 | Waller et al. | 716/126 |
| 8,099,702 B2 * | 1/2012 | Hou et al. | 716/131 |
| 2010/0058271 A1 * | 3/2010 | Correale et al. | 716/12 |
| 2010/0058272 A1 * | 3/2010 | Bowers et al. | 716/12 |

* cited by examiner

INCREMENTAL PLACEMENT AND ROUTING

FIELD OF THE INVENTION

The present invention generally relates to placement and routing of resources in programmable integrated circuits.

BACKGROUND

Programmable logic devices (PLDs) are integrated circuits (ICs) that are used to implement digital logic operations according to user configurable input. Example PLDs include Complex Programmable Logic Devices (CPLDs) and field programmable gate arrays (FPGAs). CPLDs often include several function blocks that are based on programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells determine the function of the FPGA. A specific type of FPGA uses a look-up-table (LUT)-based CLB. The configuration memory provides input values to a number of multiplexers controlled by inputs to the CLB.

A conventional design process for an integrated circuit, such as an ASIC or an FPGA begins with the creation of the design. The design specifies the function of a circuit design at a schematic or logic level and may be represented using various programmable languages (e.g., VHDL, ABEL or Verilog) or schematic capture programs. The design is synthesized to produce a logical network list ("netlist") supported by the target integrated circuit device. The synthesized design is mapped onto primitive components within the target device (e.g., programmable logic blocks of an FPGA).

Following mapping, placement of the components of the synthesized and mapped design is then performed for the target device. During placement, each mapped component of the design is assigned to a physical position on the chip. The purpose of the placer is to place connected design objects in close physical proximity to one another. This conserves space on the chip and increases the probability that the desired interconnections between components will be successfully completed by the router. Placing connected components close to one another also generally improves the performance of the circuit, since long interconnect paths are associated with excess capacitance and resistance, resulting in longer delays.

Specified connections between components of the design are routed within the target device for the placed components. Routing specifies physical wiring resources that will be used to conduct signals between pins of placed components of the design. For each connection specified in the design, routing must allocate wiring necessary to complete the connection. As used herein, the selection and assignment of wire resources in connecting the output pin of one component to the input pin of another component is referred to as routing a signal. When signals have been routed using most or all of the wiring resources in a given area, the area is generally referred to as congested, which creates competition for the remaining wiring resources in the area or makes routing of additional signals in the area impossible.

Place-and-route procedures sometimes involve optimizations of a design's timing, power consumption, routing resources utilized, and any combination thereof. In some instances, timing-based estimations of the design are also provided.

The circuit design process generally includes functional and timing simulations to verify correct operation prior to manufacturing. A design may be modified several times to correct errors identified during testing. Whenever a modification is made, the design place-and-route procedures must be repeated. Due to the large amount of time required for placement and routing of an entire design, it is desirable to avoid repeating the entire place-and-route process when only a small portion of the design has changed.

One solution is to perform place-and-route with criteria to preserve placed and routed portions of the design which are not changed. This is known as incremental placement and routing. However, due to congestion, it may not be possible to route modified signals of the design without rerouting some signals of the unchanged portion of the design. Routing software may waste a large amount of processing trying to avoid rerouting when preservation of the entire unchanged portion is not possible.

The present invention may address one or more of the above issues.

SUMMARY

In one embodiment of the invention, a processor-implemented method is provided for routing of a partially routed circuit design having modified and unmodified signals from a previous version of the circuit design. Modified signals of the partially routed circuit design are determined. The modified signals include new, changed, and deleted signals from the previous version of the circuit design. A first set of routing constraints are applied by the processor to the unmodified signals of the circuit design. The routing constraints prevent the unmodified signals from being rerouted. For each logic block of the circuit design, the number of the modified signals and the number of the unmodified signals connected to the logic block are determined. In response to one of the logic blocks having a ratio of the number of modified signals to the number of unmodified signals greater than a threshold ratio, the routing constraints are removed by the processor from one or more of the unmodified signals of the one of the logic blocks. The partially routed circuit design is then routed by the processor according to the routing constraints. A netlist of the routed circuit design is stored in a processor readable storage device.

In another embodiment, the one or more of the unmodified signals of the one of the logic blocks includes all of the unmodified signals of the one of the logic blocks.

In another embodiment, the one or more of the unmodified signals of the one of the logic blocks includes N of the unmodified signals of the one of the logic blocks, where N is an integer. The ratio of the number of modified signals less N to the number of unmodified signals plus N, is less than the threshold ratio.

In another embodiment, critical signals of the partially routed circuit design are determined. The partially routed circuit design is routed by routing the critical signals while attempting to reduce signal propagation delay of the critical signals. Non-critical signals of the partially routed circuit design are routed while attempting to reduce a number of wires used in a route of each non-critical signal.

In another embodiment, in response to determining routing of the partially routed circuit design according to the routing constraints is not possible, one or more of the routing constraints are removed. Routes of signals corresponding to the one or more of the routing constraints are deleted. The routing of the partially routed circuit design is repeated according to the routing constraints, wherein the signals corresponding to the one or more of the routing constraints are routed while maintaining signal propagation delays of the signals from the previous version of the circuit design.

In another embodiment, a second set of routing constraints is applied to the unmodified signals of the circuit design, the routing constraints of the second set preventing pin placement of unmodified signals from being modified.

In another embodiment, in response to a user command, a second set of routing constraints are created to route one or more signals of the partially routed circuit design in a resource-mode.

In another embodiment, signals of the partially routed circuit design that are unmodified and un-routed are determined. A second set of routing constraints are created to refrain from routing the unmodified and un-routed signals.

In another embodiment, the threshold ratio is 4 modified pins to 6 unmodified pins.

In another embodiment, the threshold ratio is 1 modified pin to 1 unmodified pin.

In another embodiment, a system is provided for routing of a partially routed circuit design having modified and unmodified signals from a previous version of the circuit design. The system includes a processor and a memory arrangement coupled to the processor. The memory arrangement is configured with instructions that when executed by the processor cause the processor to determine modified signals of the partially routed circuit design. The modified signals include new, changed, and deleted signals from the previous version of the circuit design. The instructions also cause the processor to apply a first set of routing constraints to the unmodified signals of the circuit design. The routing constraints prevent reroute of the unmodified signals. The instructions further cause the processor to determine, for each logic block of the circuit design, a number of modified signals and a number of unmodified signals connected to the logic block. In response to one of the logic blocks having a ratio of the number of modified signals to the number of unmodified signals greater than a threshold ratio, the instructions cause the processor to remove the first set of routing constraints from one or more of the unmodified signals of the one of the logic blocks. The instructions cause the processor to route the partially routed circuit design according to the routing constraints.

In another embodiment, the one or more of the unmodified signals of the one of the logic blocks includes all of the unmodified signals of the one of the logic blocks.

In another embodiment, the one or more of the unmodified signals of the one of the logic blocks includes N of the unmodified signals of the one of the logic blocks, where N in an integer. The ratio of the number of modified signals less N to the number of unmodified signals plus N, is less than the threshold ratio.

In another embodiment, the operations further include determining critical signals of the partially routed circuit design. The routing of the partially routed circuit design includes: routing the critical signals while attempting to reduce signal propagation delay of the critical signals; and routing non-critical signals of the partially routed circuit design while attempting to reduce a number of wires used in a route of each non-critical signal.

In another embodiment, in response to determining routing of the partially routed circuit design according to the routing constraints is not possible, the operations further include removing one or more of the routing constraints; deleting routes of signals corresponding to the one or more of the routing constraints; and repeating the routing of the partially routed circuit design according to the routing constraints. The signals corresponding to the one or more of the routing constraints are routed while maintaining signal propagation delays of the signals from the previous version of the circuit design.

In another embodiment, the operations further include applying a second set of routing constraints to the unmodified signals of the circuit design. The routing constraints of the second set prevent pin placement of unmodified signals from being modified.

In another embodiment, the operations further include creating a second set of routing constraints to route one or more signals of the partially routed circuit design in a resource-mode in response to a user command.

In another embodiment, the operations further include determining signals of the partially routed circuit design that are unmodified and un-routed, and creating a second set of routing constraints to refrain from routing the unmodified and un-routed signals.

In another embodiment, an article of manufacture is provided. The article is characterized by a non-transitory processor-readable storage medium configured with processor-executable instructions causing one or more processors to route a partially routed circuit design having modified and unmodified signals from a previous version of the circuit design. The instructions when executed by a processor cause the processor to determine modified signals of the partially routed circuit design. The modified signals include new, changed, and deleted signals from the previous version of the circuit design. The instructions further cause the processor to apply a first set of routing constraints to the unmodified signals of the circuit design. The routing constraints prevent reroute of the unmodified signals. The instructions also cause the processor to determine, for each logic block of the circuit design, a number of modified signals and a number of unmodified signals connected to the logic block. In response to one of the logic blocks having a ratio of the number of modified signals to the number of unmodified signals greater than a threshold ratio, the instructions cause the processor to remove the routing constraints from one or more of the unmodified signals of the one of the logic blocks and route the partially routed circuit design according to the routing constraints. The instructions cause the processor to store a netlist of the routed circuit design in a processor-readable storage device.

In yet another embodiment of the invention, the one or more of the unmodified signals of the one of the logic blocks includes all of the unmodified signals of the one of the logic blocks.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
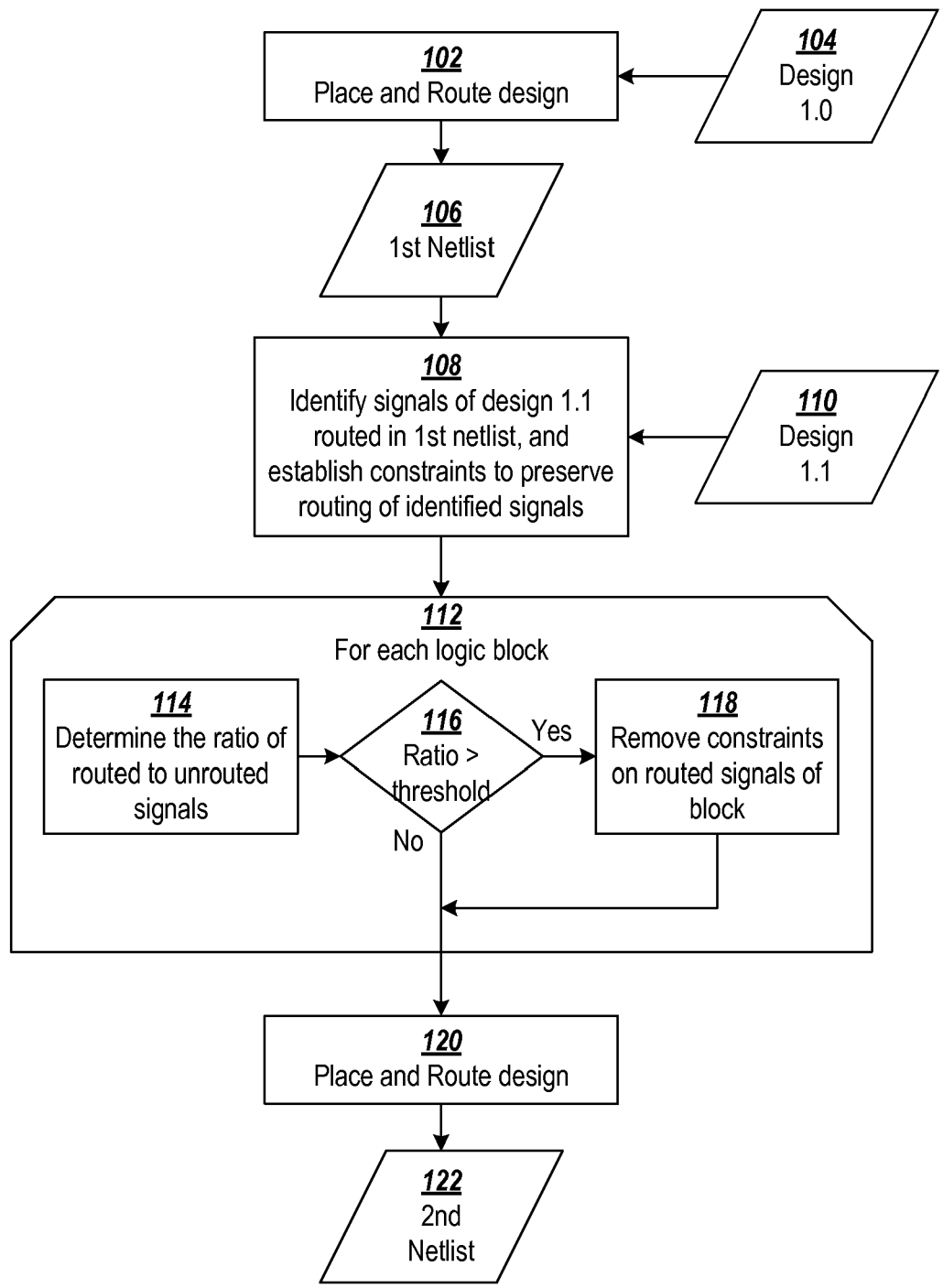
FIG. 1 shows a flowchart of an example process for placement and routing of an HDL design, in accordance with various embodiments of the invention.

A design may be modified several times throughout the development process. Due to the large amount of time required to perform for placement and routing of an entire design, it is desirable to avoid repeating the entire process of optimization and place-and-route when only a small portion of the design has changed. Incremental place-and-route may be used to preserve placed and routed portions of the design which are not changed. However, due to congestion, it may not be possible to route modified signals of the design without rerouting some signals of the unchanged portion of the design. Routing software may waste a large amount of processing trying to avoid rerouting when preservation of the entire unchanged portion is not possible.

The present invention provides a system and method that, in performing place and route, identifies and reroutes signals of the unchanged portion that are likely to cause congestion while preserving the routing of others. As used herein, a partially routed circuit design includes modified and unmodified signals. A modified signal refers to a routed or unrouted signal that has been added, deleted, or modified from the previous version of the circuit design. An unmodified signal refers to a placed and routed signal that has not been added, deleted, or modified. A mapped logic block may include a combination of modified or unmodified signals assigned to ports of the logic block.

In the process of routing an unrouted signal, routed signals may have been already routed on the wiring resources required to route the unrouted signal. This is known as congestion. In the majority of cases, congestion occurs between signals connected to the same logic blocks. Congestion also tends to occur on input pins of logic blocks. As a general result, the routing program tends to use more processing time to resolve this routing scenario.

In incremental routing, the routing algorithm attempts to preserve routing of the routed signals as much as possible. However, routed signals often need to be rerouted in later steps in order to find a solution for the modified signals. If rerouting is eventually required, processing time used to search for a non-existent solution that preserves routing is wasted.

Because the majority of congestion occurs on the resources closer to the logic blocks, the present invention determines the routing status of each signal connected to a block to determine probable congestion of the signals. If congestion is likely, one or more of the unmodified signals are rerouted. The rerouting of some of the unmodified signals makes a routable solution more likely to be available.

For example, if a logic block contains only unmodified signals, it is not likely that these signals will have to be rerouted to make resources available for an unrouted signal. In contrast, if a block contains no unmodified signals, the routing algorithm will not waste processing time trying to preserve routing of any signals. However, when a logic block contains both modified and unmodified signals, it is possible that a routable solution is not possible without rerouting one or more of the unmodified signals. Generally, a routable solution is less likely to be available when fewer routing resources are available. Therefore, as the ratio of unmodified to modified signals increases, a routable solution that preserves the previous routing of all unmodified signals becomes less likely.

The embodiments of the present invention determine the ratio of unmodified to modified signals for each mapped logic block, hereinafter referred to the interlace ratio. If the interlace ratio is higher than a selected threshold ratio, one or more unmodified signals of the block are rerouted along with the routing of any unrouted signals.

FIG. 1 shows a flowchart of a process for an example process for placement and routing of an HDL design, in accordance with various embodiments of the invention. A first version (1.0) of an HDL design 104 is placed and routed at step 102 to produce a first netlist 106. In this example, a portion of the version 1.0 HDL design 104 is modified by a designer (not shown) to produce a second version (1.1) of the HDL design 110. Signals of design version 1.1 that have been routed in the first netlist are identified at step 108. Routing constraints are created to preserve the routing of the unmodified signals.

For each mapped logic block in the design 112 the interlace ratio is determined at step 114. If the interlace ratio is greater than a selected threshold (decision step 116), the routing constraints are removed from signals of the logic block at step 118. In some another embodiment, rather than removing the constraints from all signals of the logic block, constraints may be removed until the resulting interlace ratio is below the selected threshold.

The design version 1.1 is placed and routed at step 120 to produce a second netlist 122. The placement and routing is performed according to the constraints created at step 108, as modified at step 118.

In some embodiments of the invention, pin-assignments of signals to be rerouted are preserved. Prior to rerouting, constraints are placed on the routing algorithm to fix unmodified signals to be rerouted to previously assigned pins. Because the pin assignments remain fixed, the number of non-routable solutions that are analyzed is reduced. For example, a logic block having five input pins a through e and assigned signals 1 through 5 may only have routable solutions where signals 1 and 2 are assigned to pins a and b. In this example, six routable solutions and six non-routable solutions would exist for various permutations of signals 3, 4, and 5 and pins c, d, and e (e.g., 3!=6). If pin swaps are allowed, the routing algorithm may waste time checking non-routable permutations. In this manner, by preventing pin swaps, routing run-time is reduced.

In some embodiments, pin assignments may be fixed for unrouted signals. Because the signals are not routed, preprocessing can be performed to determine the optimal pin assignment for the unrouted signals. During routing, the router attempts to find a solution using the assigned pins. Since each pin is assigned to only one signal, congestion on individual load pins is prevented and routing runtime is reduced.

Signals may be routed using a number of different routing algorithms that attempt to optimize the routing for different characteristics. In one routing algorithm, signals are routed to minimize timing delay characteristics of each signal. This is referred to as a delay-mode routing. In another routing algorithm, signals are routed to minimize the number of routing resources used. This is referred to as resource-mode routing. In general, delay-mode optimization requires a longer runtime than resource-mode optimization. In delay-mode optimization, different possible paths are analyzed or simulated to determine a propagation delay parameter.

In one embodiment, if an unmodified signal is rerouted, the signal is routed in a delay-mode that preserves the original timing delay of the signal. The routing algorithm searches for a solution that has a timing delay less than or equal to the original timing delay. However, once a solution is found the routing algorithm does not waste processing trying to further optimize the timing of the signal.

In one embodiment, unrouted signals are routed according to delay-mode or resource-mode optimization based on the criticality of the signal. The circuit design is analyzed to determine signals that are critical to the overall timing of the design. Critical signals are routed according to delay-mode optimization and non-critical signals are routed according to resource-mode optimization. In this manner, routing run-time is improved by preventing the routing algorithm from performing timing optimization on non-critical signals.

A developer may wish to test a circuit at several stages in the development cycle. If a developer plans to modify a portion of the design in the future, the developer may wish to decrease the routing run-time by routing the portion of the circuit that will be changed so that timing is not optimized. In one embodiment of the invention, a developer may select specific signals for routing in resource-mode. Accordingly, selected signals will be routed according to the faster resource-mode routing even if they are critical signals. The developer may later optimize the timing of these signals by rerouting the signals in delay-mode. In this manner, run-time of the routing is improved.

Figure 2:
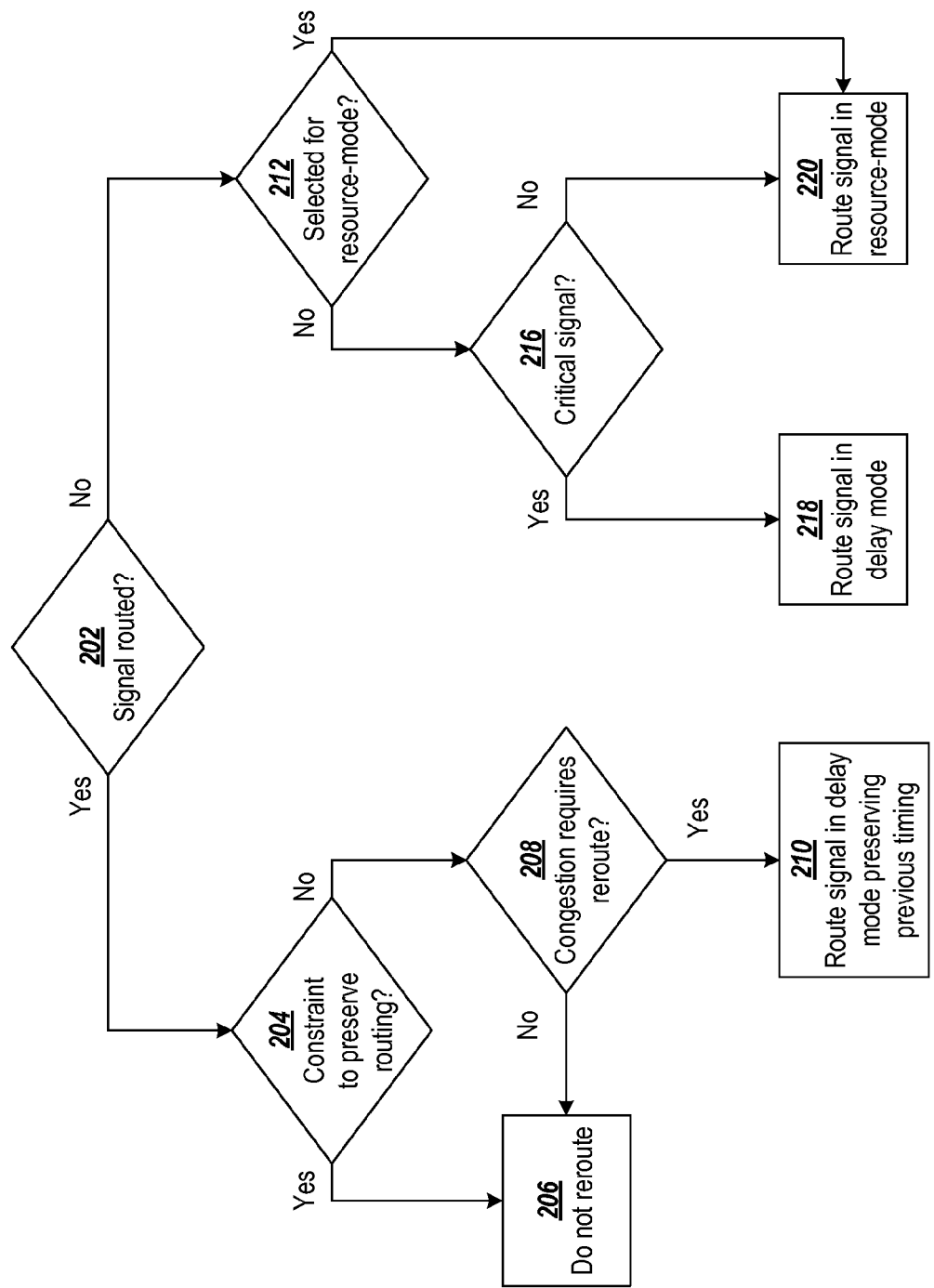
FIG. 2 shows a flowchart of an example process for routing each signal of an HDL design.

FIG. 2 shows a flowchart of an example process for selectably routing signals in different modes of optimization in accordance with one or more embodiments of the invention. Each signal is determined to be routed or unrouted. If a signal is routed (decision step 202), constraints are examined to determine whether the existing routing of the signal is to be preserved at decision step 204. The constraints indicating routing is to be preserved may be added or removed for a signal, for example, as shown in FIG. 1. If routing is to be preserved, the signal is not rerouted (step 206). If preservation of the signal is not required, decision step 208 determines whether or not congestion requires rerouting of the signal. If not, the signal is not rerouted (step 206). Otherwise, the signal is rerouted in a delay-mode in which the timing delay of the original routing is preserved 210.

If a signal is not routed (decision step 202), the routing process may check whether the signal has been specifically selected for forced resource-mode routing at decision step 212. If the signal has been selected, the signal is routed in resource-mode at step 220. If deferred optimization has not been selected, the signal is analyzed at decision step 216 to determine whether or not it is a critical signal. If the signal is critical, the signal is routed in delay-mode at step 218. If it is not a critical signal, the signal is routed in resource-mode at step 220.

Figure 3:
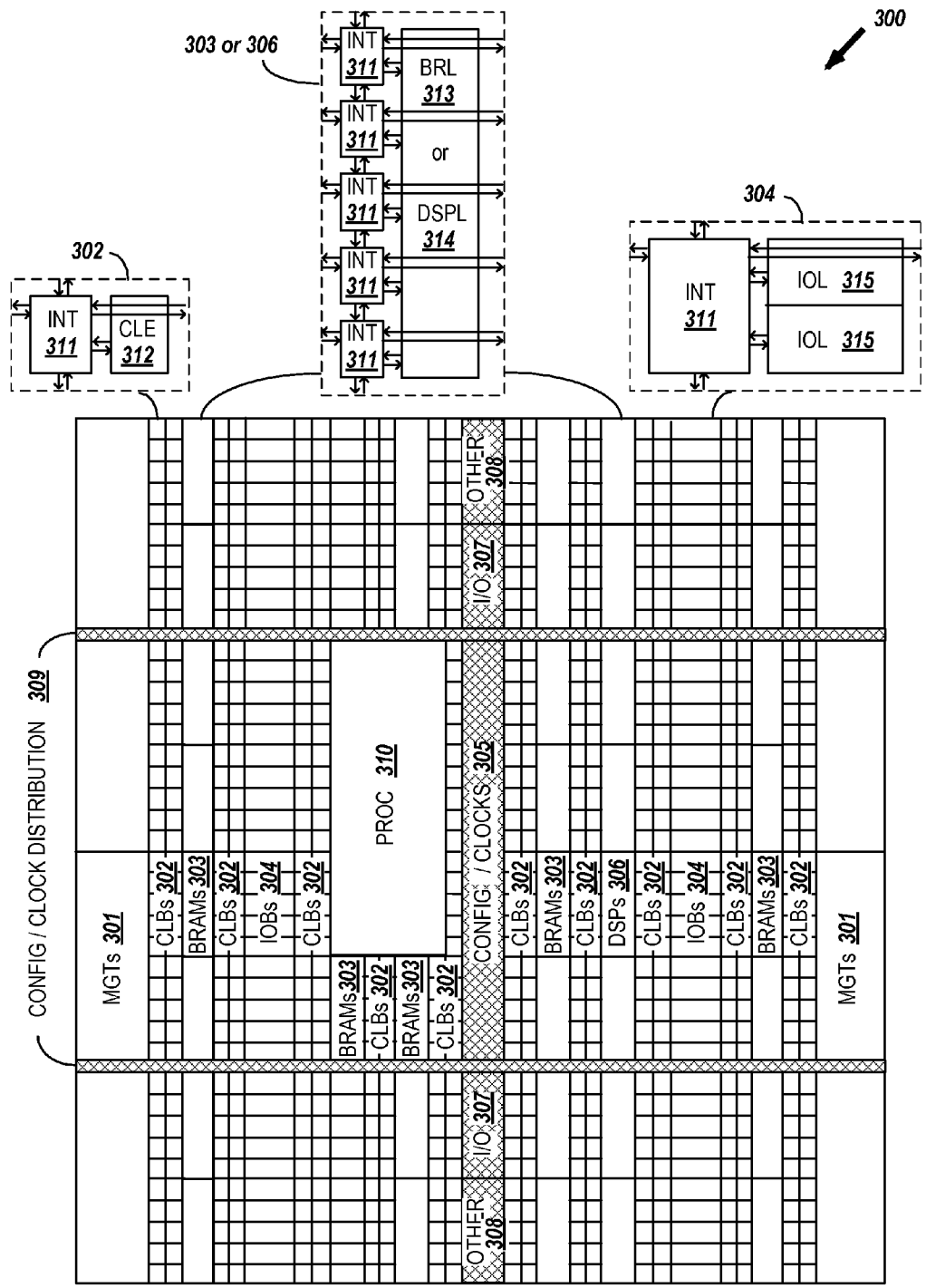
FIG. 3 is a block diagram of an example field programmable gate array (FPGA) which may be used as a target device for placement and routing in accordance with various embodiments of the invention.

FIG. 3 is a block diagram of an example field programmable gate array (FPGA) which may be used as a target device for place-and-route in accordance with various embodiments of the invention. FPGAs can include several different types of programmable logic blocks in the array. For example, FIG. 3 illustrates an FPGA architecture (300) that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307), for example, clock ports, and other programmable logic 308 such as digital clock managers, analog-to-digital converters, system monitoring logic, and so forth. Some FPGAs also include dedicated processor blocks (PROC 310). While not shown, it will be appreciated that FPGA 300 also includes external and internal reconfiguration ports.

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element INT 311 also includes the connections to and from the programmable logic element within the same tile, as shown by the examples included at the top of FIG. 3.

For example, a CLB 302 can include a configurable logic element CLE 312 that can be programmed to implement user logic plus a single programmable interconnect element INT 311. A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 306 can include a DSP logic element (DSPL 314) in addition to an appropriate number of programmable interconnect elements. With the FPGA as the target device, an inference pattern would be provided for the DSP logic element(s) available on the device. If portions of the design are found to be optimal, after timing analysis, those portions would be implemented by the DSP elements.

An IOB 304 can include, for example, two instances of an input/output logic element (IOL 315) in addition to one instance of the programmable interconnect element INT 311. As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

Figure 4:
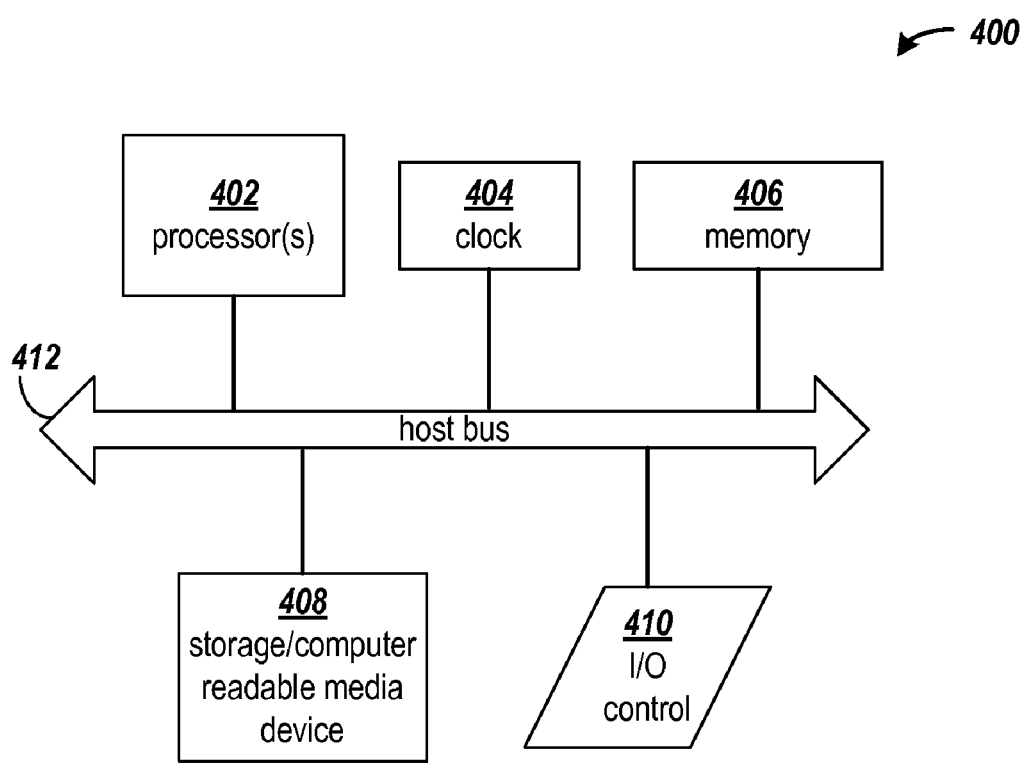
FIG. 4 illustrates a block diagram of a computing arrangement for implementing placement and routing in accordance with several embodiments of the invention.

FIG. 4 illustrates a block diagram of a computing arrangement that may be configured to implement the place-and-route processes described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of non-transitory computer-readable storage media or delivery channels such as magnetic or optical disks or tapes, electronic storage devices, or as application services over a network.

Processor computing arrangement 400 includes one or more processors 402, a clock signal generator 404, a memory unit 406, a storage unit 408, and an input/output control unit 410 coupled to host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 402 may be one or more general purpose processors, or a combination of one or more general purpose processors and suitable co-processors, or one or more specialized processors (e.g., RISC, CISC, pipelined, etc.).

The memory arrangement 406 typically includes multiple levels of cache memory and a main memory. The storage arrangement 408 may include local and/or remote persistent storage such as provided by magnetic disks (not shown), flash, EPROM, or other non-volatile data storage. The storage unit may be read or read/write capable. Further, the memory 406 and storage 408 may be combined in a single arrangement.

The processor arrangement 402 executes the software in storage 408 and/or memory 406 arrangements, reads data from and stores data to the storage 408 and/or memory 406 arrangements, and communicates with external devices through the input/output control arrangement 410. These functions are synchronized by the clock signal generator 404. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different embodiments of the present invention.

The present invention is thought to be applicable to a variety of systems for the placement and routing of circuit designs. Further, while FPGAs and other PLDs are described as suitable target programmable ICs to which the systems and methods of the invention can be applied, the invention is not limited thereto. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims and equivalents thereof.

What is claimed is:

1. A processor-implemented method for routing of a partially routed circuit design having modified and unmodified signals from a previous version of the circuit design, comprising:

determining the modified signals of the partially routed circuit design, the modified signals including new, changed, and deleted signals from the previous version of the circuit design;

applying, by the processor, a first set of routing constraints to the unmodified signals of the circuit design, the routing constraints preventing reroute of the unmodified signals;

determining for each logic block of the circuit design, a number of the modified signals and a number of the unmodified signals connected to the logic block;

in response to one of the logic blocks having a ratio of the number of modified signals to the number of unmodified signals greater than a threshold ratio, removing, by the processor, the routing constraints from one or more of the unmodified signals of the one of the logic blocks; and incrementally routing, by the processor, the partially routed circuit design according to the routing constraints.

2. The processor-implemented method of claim 1, wherein the one or more of the unmodified signals of the one of the logic blocks includes all of the unmodified signals of the one of the logic blocks.

3. The processor-implemented method of claim 1, wherein:

the one or more of the unmodified signals of the one of the logic blocks includes N of the unmodified signals of the one of the logic blocks, N being an integer; and the ratio of the number of modified signals minus N to the number of unmodified signals plus N, is less than the threshold ratio.

4. The processor-implemented method of claim 1, further comprising:

determining critical signals of the partially routed circuit design; and wherein, routing the partially routed circuit design includes:

routing the critical signals while attempting to reduce signal propagation delay of the critical signals; and routing non-critical signals of the partially routed circuit design while attempting to reduce a number of wires used in a route of each non-critical signal.

5. The processor-implemented method of claim 1, further comprising, in response to determining routing of the partially routed circuit design according to the routing constraints is not possible:

removing one or more of the routing constraints;

deleting routes of signals corresponding to the one or more of the routing constraints; and repeating the routing of the partially routed circuit design according to the routing constraints, wherein the signals corresponding to the one or more of the routing constraints are routed while maintaining signal propagation delays of the signals from the previous version of the circuit design.

6. The processor-implemented method of claim 1, further comprising applying a second set of routing constraints to the unmodified signals of the circuit design, the routing constraints of the second set preventing pin placement of unmodified signals from being modified.

7. The processor-implemented method of claim 1, further comprising, in response to a user command, creating a second set of routing constraints to route one or more signals of the partially routed circuit design in a resource-mode.

8. The processor-implemented method of claim 1, further comprising:
   determining signals of the partially routed circuit design that are unmodified and un-routed; and
   creating a second set of routing constraints to refrain from routing the unmodified and un-routed signals.

9. The processor-implemented method of claim 1, wherein the threshold ratio is four modified signals to six unmodified signals.

10. The processor-implemented method of claim 1, wherein the threshold ratio is one modified signals to one unmodified signals.

11. A system for routing of a partially routed circuit design having modified and unmodified signals from a previous version of the circuit design, the system comprising:
   a processor; and
   a memory arrangement coupled to the processor, wherein the memory arrangement is configured with instructions that when executed by the processor cause the processor to perform operations including:
      determining modified signals of the partially routed circuit design, the modified signals including new, changed, and deleted signals from the previous version of the circuit design;
      applying a first set of routing constraints to the unmodified signals of the circuit design, the routing constraints preventing rerouting of the unmodified signals;
      determining for each logic block of the circuit design, a number of modified signals and a number of unmodified signals connected to the logic block;
      in response to one of the logic blocks having a ratio of the number of modified signals to the number of unmodified signals greater than a threshold ratio, removing the first set of routing constraints from one or more of the unmodified signals of the one of the logic blocks; and
      incrementally routing the partially routed circuit design according to the routing constraints.

12. The system of claim 11, wherein the one or more of the unmodified signals of the one of the logic blocks includes all of the unmodified signals of the one of the logic blocks.

13. The system of claim 11, wherein:
   the one or more of the unmodified signals of the one of the logic blocks includes N of the unmodified signals of the one of the logic blocks, N being an integer; and
   the ratio of the number of modified signals minus N to the number of unmodified signals plus N, is less than the threshold ratio.

14. The system of claim 11,
   wherein the operations further comprise determining critical signals of the partially routed circuit design; and
   wherein routing the partially routed circuit design comprises:
      routing the critical signals while attempting to reduce signal propagation delay of the critical signals; and
      routing non-critical signals of the partially routed circuit design while attempting to reduce a number of wires used in a route of each non-critical signal.

15. The system of claim 11, wherein the operations further comprise, in response to determining routing of the partially routed circuit design according to the routing constraints is not possible:
   removing one or more of the routing constraints;
   deleting routes of signals corresponding to the one or more of the routing constraints; and
   repeating the routing of the partially routed circuit design according to the routing constraints, wherein the signals corresponding to the one or more of the routing constraints are routed while maintaining signal propagation delays of the signals from the previous version of the circuit design.

16. The system of claim 11, wherein the operations further comprise applying a second set of routing constraints to the unmodified signals of the circuit design, the routing constraints of the second set preventing pin placement of unmodified signals from being modified.

17. The system of claim 11, wherein the operations further comprise, in response to a user command, creating a second set of routing constraints to route one or more signals of the partially routed circuit design in a resource-mode.

18. The system of claim 11, wherein the operations further comprise:
   determining signals of the partially routed circuit design that are unmodified and un-routed; and
   creating a second set of routing constraints to refrain from routing the unmodified and un-routed signals.

19. An article of manufacture, comprising:
   a non-transitory processor-readable storage medium storing processor-executable instructions causing one or more processors to route a partially routed circuit design having modified and unmodified signals from a previous version of the circuit design, the instructions when executed by a processor causing the processor to perform operations including:
      determining modified signals of the partially routed circuit design, the modified signals including new, changed, and deleted signals from the previous version of the circuit design;
      applying a first set of routing constraints to the unmodified signals of the circuit design, the routing constraints preventing rerouting of the unmodified signals;
      determining for each logic block of the circuit design, a number of modified signals and a number of unmodified signals connected to the logic block;
      in response to one of the logic blocks having a ratio of the number of modified signals to the number of unmodified signals greater than a threshold ratio, removing the routing constraints from one or more of the unmodified signals of the one of the logic blocks; and
      incrementally routing the partially routed circuit design according to the routing constraints.

20. The article of manufacture of claim 19, wherein the one or more of the unmodified signals of the one of the logic blocks includes all of the unmodified signals of the one of the logic blocks.

* * * * *